United States Patent [19]

Muscat

[11] Patent Number: 4,723,784
[45] Date of Patent: Feb. 9, 1988

[54] CHILD CARRIER

[76] Inventor: Jean Muscat, P.O. Box 251, Algonquin, Ill. 60102

[21] Appl. No.: 887,518

[22] Filed: Jul. 21, 1986

[51] Int. Cl.⁴ .............................................. B62B 7/06
[52] U.S. Cl. ............................... 280/47.38; 280/79.2; 296/64; 296/197; 297/217; D34/17
[58] Field of Search ................ 297/217, 250, 464; 312/250; 5/81 R; D34/17; D6/335; 220/408, 410; 114/77 R; 296/22, 63, 64, 197; 280/79.2, 47.35, 47.38, 47.4

[56] References Cited
U.S. PATENT DOCUMENTS

| | | | |
|---|---|---|---|
| 1,532,337 | 4/1925 | O'Hearn | 280/47.38 X |
| 2,007,804 | 7/1935 | Kilimnik | 280/47.4 |
| 2,409,528 | 10/1946 | Baunach | 296/22 X |
| 3,318,612 | 5/1967 | Kuhn | 280/87.01 X |
| 3,713,652 | 1/1973 | Rakestraw | 297/217 X |
| 4,067,608 | 1/1978 | Wimmersperg | 297/464 X |
| 4,367,829 | 1/1983 | Kusz | 297/217 X |
| 4,500,135 | 2/1985 | Kincheloe | 297/250 |

Primary Examiner—John J. Love
Assistant Examiner—Michael Mar
Attorney, Agent, or Firm—Douglas B. White

[57] ABSTRACT

There is provided an enclosed cart having a plurality of openings in the top thereof into each of which a contoured cushioned module for containment of a child is inserted.

4 Claims, 3 Drawing Figures

CHILD CARRIER

BACKGROUND OF THE INVENTION

The present invention relates generally to rolling carts or the like and particularly to devices useful for quickly transporting several small children at one time as in an emergency evacuation.

Prior devices for transporting small children consist of the traditional baby carriage and baby stroller. However, baby carriages are unstable and have limited capacity and therefore are not practical for use in emergency evacuation of toddlers. The traditional baby stroller has limited capacity and is therefore inefficient and impractical.

Modern day care centers require efficient means for emergency evacuation of pre-school chidren. The system must effectively contain and confine the children comfortably, prevent injury during the exit, and minimize trauma and hysteria. A recently developed system described in German Pat. No. 2,034,099 uses a cart having seating for children removably hung around its periphery. This arrangement is capable of transporting several children, but the seat hanging arrangement is not secure and the children are exposed during the emergency.

SUMMARY OF THE INVENTION

Accordingly, it is a principal object of the present invention to provide means for emergency evacuation of small chidren which efficiently transports a group of children in a protected manner.

In the preferred embodiment of the present invention, there is provided an enclosed cart having a plurality of openings in the top thereof into each of which a countoured cushioned module for containment of a child is inserted. With this arrangement, a child will be substantially enclosed and protected, and trauma to the child will be minimized.

Other objects and advantages of the invention will become apparent upon reading the following detailed description and upon reference to the drawings.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 3:
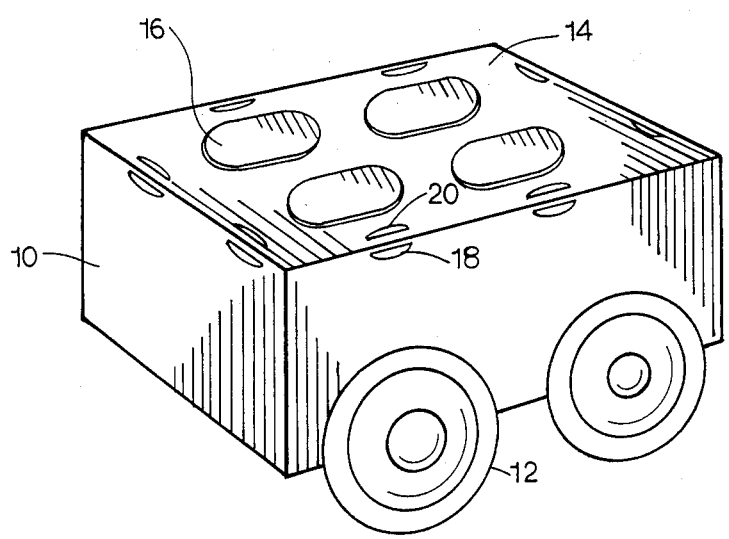
FIG. 3 is a perspective view of the child carrier of the present invention.

Turning first to FIG. 3, there is shown generally the child carrier of the present invention having an outer casing 10 supported on wheels 12. The top of the cart is closed by a panel 14 having elongated openings 16 defined therein. To assist in handling the cart, there are provided openings 18 in the casing and openings 20 in the top which together form a handle.

Figure 1:
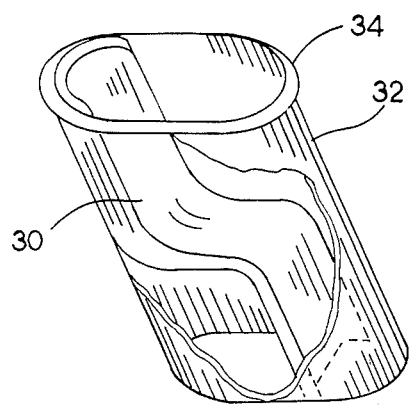
FIG. 1 is a partially cut-away view of the module insert of the present invention.
Figure 2:
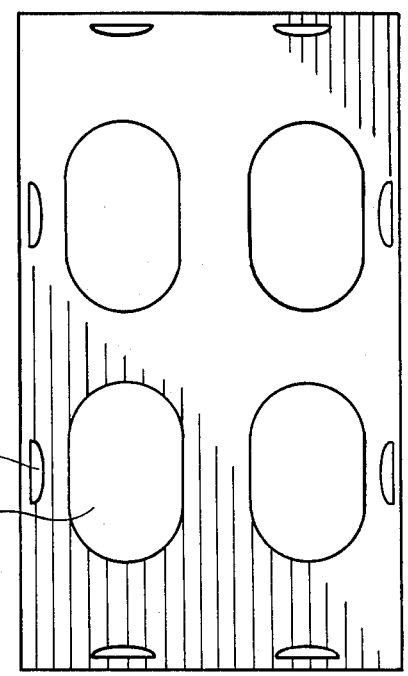
FIG. 2 is a top view of the child carrier of the present invention.

A module as shown in FIG. 1 contains a contoured seat 30 within a tubular construction 32 of generally elliptical cross section. This module has formed at its uppermost extremity a lip 34 to catch and rest upon the cart top when inserted within the openings 16. In the preferred embodiment, the module would be padded throughout for the safety and comfort of the child. Being modular, different sizes of module and contoured seating may be used depending upon the size of the children to be transported. The module is preferably long enough to seat a child with his head below the lip to minimize the exposure and trauma to the child.

In operation, this emergency evacuation cart would be kept in close proximity to the children and the emergency exits. The operator would lift and place each child into a module positioned within the cart. The cart would be grasped by the operator at the formed handles and rolled to the exit. The enlarged wheels 12 are provided to minimize resistance when traversing irregularities.

It can readily be appreciated that this system provides an emergency evacuation device which is efficient while providing security and protection to the children. In a further aspect of this invention, a protective lid (not shown) may be removable affixed to the top of the chart. This would provide even further protection in the event of falling debris.

I claim:

1. A cart for the emergency evacuation of children comprising:
    a base having a plurality of sidewalls;
    a plurality of wheels supporting said base;
    a panel affixed to the top of said base and having elongated openings defined therein; and
    a plurality of modules arranged to be removably positioned through said openings in said panel, each module having a tubular construction with a cross-sectional shape corresponding to said elongated openings, a top opening through which a child may enter, and a seat contained therein, wherein the top of said module is substantially at the same level with said panel when said module is received within said cart and wherein said module is of sufficient size to receive the entire body of a child while seated therein.

2. The assembly of claim 1 wherein said plurality of modules contains seats of a variety of sizes to allow the modules to be fitted to the children to be evacuated.

3. The assembly of claim 2 wherein said modules have defined thereon an outward protruding flange to engage said top member and secure said module therein.

4. The assembly of claim 3 wherein said modules are substantially elliptical in cross section.

* * * * *